United States Patent
Deines

(10) Patent No.: US 7,202,942 B2
(45) Date of Patent: *Apr. 10, 2007

(54) SYSTEM AND METHOD FOR MEASURING VELOCITY USING FREQUENCY MODULATION OF LASER OUTPUT

(75) Inventor: Kent L. Deines, Poway, CA (US)

(73) Assignee: Doppler, Ltd., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/227,383

(22) Filed: Sep. 15, 2005

(65) Prior Publication Data

US 2007/0058157 A1    Mar. 15, 2007

Related U.S. Application Data

(63) Continuation of application No. 10/985,395, filed on Nov. 10, 2004, now Pat. No. 7,061,592, which is a continuation of application No. 10/447,442, filed on May 28, 2003, now Pat. No. 6,885,438.

(51) Int. Cl.
*G01P 3/36* (2006.01)
(52) U.S. Cl. ...................... 356/28.5; 356/28
(58) Field of Classification Search .............. 356/28, 356/28.5; 342/104–106, 112, 200
See application file for complete search history.

(56) References Cited

U.S. PATENT DOCUMENTS

| | | | |
|---|---|---|---|
| 3,915,572 A | 10/1975 | Orloff | |
| 4,594,000 A | 6/1986 | Falk et al. | |
| 4,611,912 A | 9/1986 | Falk et al. | |
| 4,846,571 A | 7/1989 | Jelalian et al. | |
| 4,902,125 A | 2/1990 | Keene et al. | |
| 5,006,721 A | 4/1991 | Cameron et al. | |
| 5,029,999 A | 7/1991 | Kremer et al. | |
| 5,088,815 A | 2/1992 | Garnier et al. | |
| 5,117,239 A | 5/1992 | Riza | |
| 5,157,257 A | 10/1992 | Geiger | |
| 5,164,784 A | 11/1992 | Waggoner | |

(Continued)

OTHER PUBLICATIONS

Koelink et al. (1994) Fiber-coupled self-mixing diode-laser Doppler velocimeter: technical aspects and flow velocity profile disturbances in water and blood flows. Applied Optics. 33:5628-5641.

(Continued)

*Primary Examiner*—Thomas H. Tarcza
*Assistant Examiner*—Isam Alsomiri
(74) *Attorney, Agent, or Firm*—Knobbe Martens Olson & Bear LLP

(57) ABSTRACT

A system for measuring velocity of a target is disclosed. In one embodiment, the system includes a laser device, a detector and a signal processor. The laser device produces a frequency-modulated laser beam, wherein the frequency-modulated beam is split into at least two laser beams, wherein a reflected beam comprising one split beam is directed to the target and reflected from the target. The detector detects a combination of the reflected beam and a reference beam comprising another split beam, wherein the reflected beam and the reference beam have unequal delays. The signal processor obtains velocity information from the combined beam by use of Doppler-shifted harmonics of the modulation frequency.

44 Claims, 13 Drawing Sheets

U.S. PATENT DOCUMENTS

| | | |
|---|---|---|
| 5,170,218 A | 12/1992 | Keene |
| 5,216,477 A | 6/1993 | Korb |
| 5,221,927 A | 6/1993 | Palmer |
| 5,250,810 A | 10/1993 | Geiger |
| 5,267,010 A | 11/1993 | Kremer et al. |
| 5,274,361 A | 12/1993 | Snow |
| 5,394,233 A | 2/1995 | Wang |
| 5,500,729 A | 3/1996 | Redman et al. |
| 5,587,785 A | 12/1996 | Kato et al. |
| 5,610,705 A | 3/1997 | Brosnan et al. |
| 5,822,047 A | 10/1998 | Contarino et al. |
| 5,838,439 A | 11/1998 | Zang et al. |
| 6,040,898 A | 3/2000 | Mrosik et al. |
| 6,097,331 A | 8/2000 | Matsugatani et al. |
| 6,100,965 A | 8/2000 | Nerin |
| 6,133,993 A | 10/2000 | Labaar |
| 6,141,086 A | 10/2000 | Vahala et al. |
| 6,147,747 A | 11/2000 | Kavaya et al. |
| 6,181,412 B1 | 1/2001 | Popescu et al. |
| 6,212,951 B1 | 4/2001 | Derevyagin |
| 6,301,968 B1 | 10/2001 | Maruyama et al. |
| 6,311,121 B1 | 10/2001 | Kuragaki et al. |
| 6,311,529 B1 | 11/2001 | Kang |
| 6,317,073 B1 | 11/2001 | Tamatsu et al. |
| 6,320,651 B1 | 11/2001 | Manhart et al. |
| 6,323,943 B1 | 11/2001 | Maruyama et al. |
| 6,608,669 B2 | 8/2003 | Holton |
| 6,671,638 B2 | 12/2003 | Kitazumi et al. |
| 6,707,027 B2 | 3/2004 | Liess et al. |
| 6,759,671 B2 | 7/2004 | Liess et al. |
| 6,813,218 B1 | 11/2004 | Antonelli et al. |

OTHER PUBLICATIONS

Koelink et al. (1992) Laser Doppler velocimeter based on the self-mixing effect in a fiber-coupled semiconductor laser: theory. Applied Optics. 31:3401-3408.

Rudd (1968) A laser Doppler velocimeter employing the laser as a mixer-oscillator. Journal of Physics E. 1:723-726.

Shimizu (1987) Directional discrimination in the self-mixing type laser Doppler velocimeter. Applied Optics. 26:4541-4544.

Shinohara et al. (1986) Laser Doppler velocimeter using the self-mixing effect of a semiconductor laser diode. Applied Optics. 25:1417-1419.

Kenneth Miller, (1972) A Covariance Approach to Spectral Moment Estimation. IEEE Transactions on Information Theory. vol. It-18, No. 5, pp. 588-596.

Pan et al. (1996) Measuravle-Range Extension of Range-Finding Speedometer Using Self-Mixing Laser Diode, IEEE Industry Applications Conference, vol. 3, Meeting 31, pp. 1640-1644.

Hara et al., (1997) New Digital Vibrometer with High Accuracy Using Self-Mixing Type LDV, IEEE Instrumentation/Measurement Technology Conference, vol. 2, Conf. 14, pp. 860-864.

SYSTEM AND METHOD FOR MEASURING VELOCITY USING FREQUENCY MODULATION OF LASER OUTPUT

RELATED APPLICATIONS

This application is a continuation application which claims priority under 35 U.S.C. § 120 from application Ser. No. 10/985,395 filed Nov. 10, 2004, now U.S. Pat. No. 7,061,592 which is hereby incorporated by reference. Application Ser. No. 10/985,395 is also a continuation application which claimed priority under 35 U.S.C. § 120 from application Ser. No. 10/447,442 filed May 28, 2003, now U.S. Pat. No. 6,885,438, issued Apr. 26, 2005, which is hereby incorporated by reference.

BACKGROUND

1. Technical Field

The invention relates to a velocity measurement system, and particularly to a system and method for measuring the direction and magnitude of the velocity of a target by performing frequency modulation of a laser output.

2. Description of the Related Technology

A number of systems and apparatuses have been developed for measuring the distance and velocity of an object using various methods.

As one example of the systems, U.S. Pat. No. 6,133,993 discloses "a length and velocity measurement apparatus." The apparatus discloses using amplitude modulation (AM) and Doppler shift of carrier in order to measure velocity.

As another example of the systems, U.S. Pat. No. 6,317,073 discloses "FW-CW radar system for measuring distance to and relative speed of a target." The system measures the speed and distance of the vehicle using a radar wave.

In addition to the above patents, many other U.S. patents, such as U.S. Pat. No. 6,311,121, U.S. Pat. No. 6,141,086, U.S. Pat. No. 5,164,784 and U.S. Pat. No. 3,915,572, etc., discuss methods for measuring speed of a target.

SUMMARY OF CERTAIN INVENTIVE ASPECTS OF THE INVENTION

One aspect of the invention provides a system for measuring velocity of a target. The system comprises a laser device, a detector and a signal processor. The laser device produces a frequency-modulated laser beam, wherein the frequency-modulated beam is split into at least two laser beams, wherein a reflected beam comprising one split beam is directed to the target and reflected from the target. The detector detects a combination of the reflected beam and a reference beam comprising another split beam, wherein the reflected beam and the reference beam have unequal delays. The signal processor obtains velocity information from the combined beam by use of Doppler-shifted harmonics of the modulation frequency.

Another aspect of the invention provides a system for measuring velocity of a target. The system comprises a laser device and a signal processor. The laser device produces a frequency modulated laser beam, which is directed to the target and reflected from the target, wherein the laser device comprises a detector configured to detect a combination of the beam reflected from the target and the frequency modulated laser beam, wherein the reflected beam and the frequency modulated laser beam have unequal delays. The signal processor obtains both sign and magnitude of the velocity from the combined beam by use of Doppler-shifted harmonics of the modulation frequency, wherein the harmonic frequencies are centered around one odd and one even harmonic of the modulation frequency.

Another aspect of the invention provides a system for measuring velocity of a target. The system comprises means for generating a frequency-modulated laser signal, wherein the frequency modulated signal is split into at least two split laser beams, wherein a reflected beam comprising one split laser beam is directed to the target and reflected from the target. The system also comprises means for receiving the reflected beam and a reference beam comprising another split laser beam, wherein the reflected beam and reference beam have unequal delays, and means for obtaining velocity information from a combination of the reflected beam and the split laser beam by use of Doppler-shifted harmonics of the modulation frequency Still another aspect of the invention provides a method of measuring velocity of a target. The method comprises generating a frequency-modulated laser signal, which is directed to and reflected from the target, and combining the reflected signal with a reference signal comprising the frequency-modulated laser signal transmitted via another signal path, wherein the reflected signal and reference signal have unequal delays. The method also comprises obtaining velocity information from the combined signal by use of Doppler-shifted harmonics of the modulation frequency.

DESCRIPTION OF CERTAIN INVENTIVE EMBODIMENTS

Figure 1:
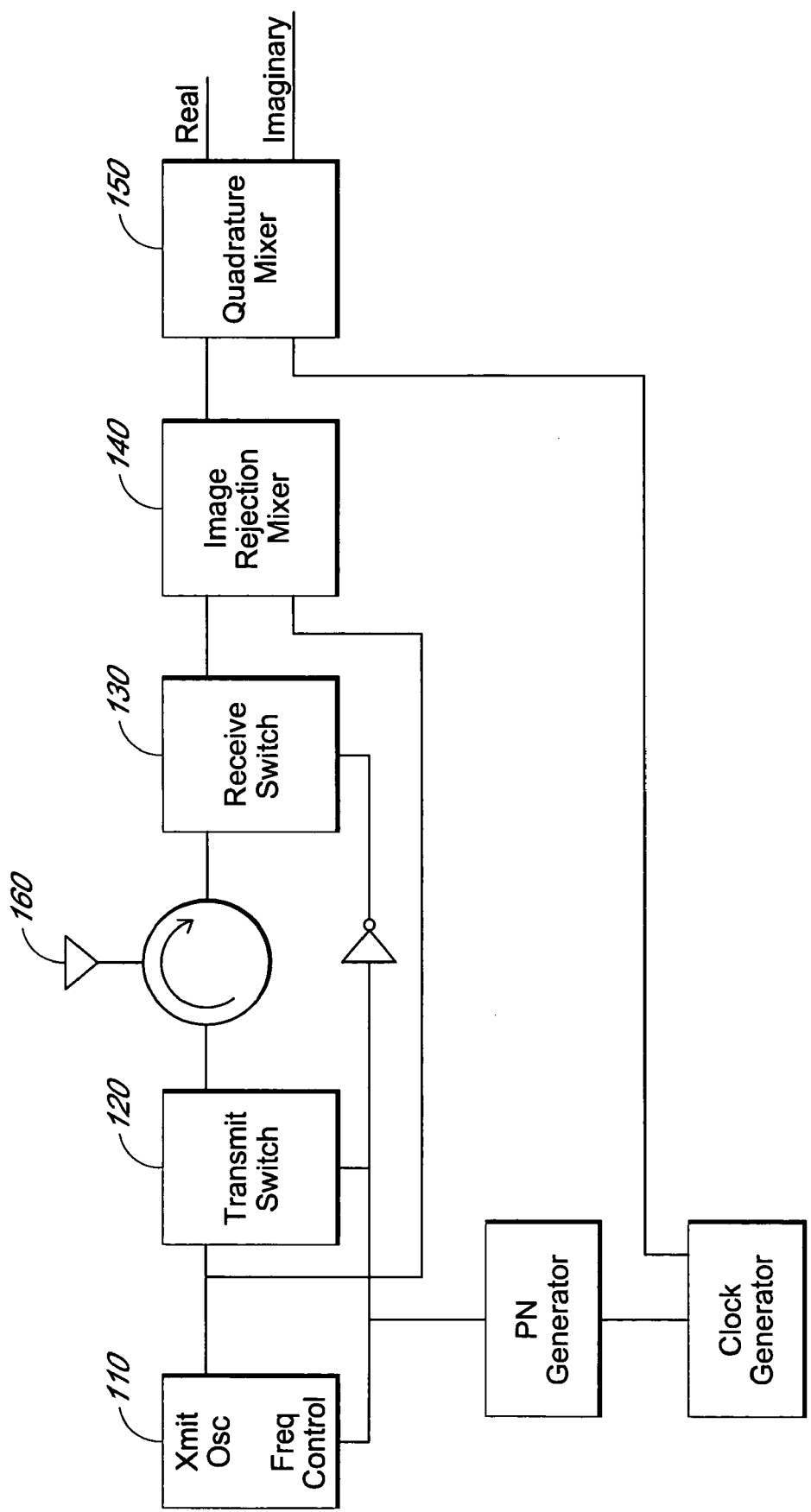
FIG. 1 illustrates a block diagram of a Doppler radar system.

There are many Doppler velocimeters that measure the velocity of a target using the Doppler effect. Among them, some Doppler velocimeters use a laser, which will be hereinafter referred to as "laser Doppler velocimeters" for convenience. Laser Doppler velocimeters can be classified as either a Type 1 system or a Type 2 system.

The Type 1 system measures the speed of the target moving toward (or away) from the system along the beam. The laser output is split into two beams. One beam is aimed at the target and is reflected by it. The energy reflected by the target is collected and added to the other reference beam. The total beam is applied to the detector(s). No motion creates a zero frequency output at the detector. Equal motion in either direction causes the same output of the detector. The Doppler frequency is then determined by processing the detector output by some type of signal processor. The Type 1 system comprises Classes A–G. Some of the Classes relate to the approach for determining the direction of the motion.

The Type 1 Class A system does not attempt to determine the direction of motion.

The Type 1 Class B system is built with a Bragg Cell in series with one of the two beams, usually the reference beam. The Bragg Cell is used to offset the frequency in the beam by a precisely known amount. The result is that the "zero Doppler" frequency at the output of the detector is the frequency offset created by the Bragg Cell. A target velocity toward system further offsets this frequency one way and motion in the other direction offsets the frequency in the other direction. This system can tell the direction of motion.

In the Type 1 Class C system, the frequency of the laser is swept up in frequency (chirped) and then swept down. The sweeps are treated as if they were two independent steps. Since the path length directly from the laser to the detector is different (shorter) from the path length from the laser to the detector via the target, the frequency during each sweep at the detector output will be proportional to the product of the sweep rate and path length difference with the Doppler frequency added. By combining the measurements of the frequency at the output of the detector during each of the sweeps, the Doppler frequency, including direction information, may be determined. For instance, if the sweep rates are equal but opposite in sign, the Doppler frequency is half of the sum of the frequency output during each sweep. The difference in the two path lengths can be found by adding the two measurements as well. This system can therefore determine both the range to the target and the speed of the target to or from the system. The problem with this system is that the sweep rate must be precisely controlled. If it is not, an error of the Doppler shift is created. This is very hard to do with a laser.

The Type 1 Class D system uses 2 "edge filters" to separate the positive and negative Doppler frequencies. The reflected beam from the target and the reference beam are split into two beams, respectively, one of the beams from the target going through a filter with the lower edge of its passband at the zero Doppler frequency. Positive Doppler frequencies pass through this filter and negative ones are rejected. After passing through the filter the beam is added to one of the reference beams and applied to the detector. This detector is used for the positive Doppler. The other beam from the target passes through a filter whose upper edge of its passband is at the zero Doppler frequency. This filter rejects positive Doppler frequencies and passes negative Doppler frequencies. After passing through the filter it is added to the reference beam and applied to the detector. This detector is used for the negative Doppler. Thus, the direction of motion is determined. This system has a problem in that it is difficult to precisely set the edge of the filters at the zero Doppler frequency and ensure that there are no drift issues. Also any gain slope in the passband of the filters may induce an error in the Doppler frequency measurement.

The Type 1 Class E system is similar to the Type 1 Class A system, but in this system there are actually two detectors. Before the reference beam and the beam from the target are added, each of them is split into two beams. Each one is added and applied to a detector. The path length involved in the two paths to the detector differs in the two cases by 90 degrees. The two detector outputs form a quadrature pair that permits the determination of the direction of motion as well at the magnitude. This approach is common in radar and sonar, but for laser systems it is hard to create and maintain the path length differences because they are so small.

The Type 1 Class F system passes the reflected energy through a device that permits the frequency of the reflected energy to be measured optically. The received energy is passed through some type of filter that converts frequency to amplitude, which is measured as an analog for frequency.

The Type 1 Class G system uses the laser as both the light source and detector/mixer. The reflected light from the target re-enters the laser. The laser mixes the light in the laser with the reflected light to produce the difference frequency. This is commonly performed with semiconductor lasers because they actually have a detector diode to measure the laser output power that can be used as a mixer/detector (see "Laser Doppler Velocimeter employing the laser as mixer-oscillator," Rudd, J. Phys. E 1, 1968, 723–726 or "Laser Doppler Velocimeter using the self-mixing effect of semiconductor laser diode," Shinohara, et al., Applied Optics 25, May 1, 1986, 1417–1419) but can also be done with other laser types as well. If the light reflected from the target into the laser is strong enough, it will change the operation of the laser and distort the shape of the waveform generated from the mixer. The new waveform shape is a sawtooth and the direction of the motion can be determined from the sawtooth shape. This scheme for direction sensing requires that the reflected signal be strong, not found in most system applications.

The Type 2 system measures velocity across the beam (not along it) and has the characteristics that the laser output is split into two beams. Both beams are aimed so as to be nearly parallel and intersect at the target in the same spot. This creates an interference pattern on the target. The reflected energy from the target is collected and applied to a detector. The Doppler frequency is then determined by processing the detector output by some type of signal processor. The Type 2 system comprises Classes A–C.

In the Type 2 Class A system, the laser output is split into two (equal power) beams. Both beams hit the target in the same spot, but from slightly different directions, which creates an interference pattern on the target. Some of the reflected energy from the target is collected and applied to a detector. When there is motion of the target across the interference pattern, the energy hitting the detector fluctuates. From the frequency of the detector output the motion of the target can be determined. This system is unable to tell the direction of the motion.

In the Type 2 Class B system, a Bragg Cell in series with one of the two arms of the Type 2 Class A system is added. The result is that the interference pattern on the target sweeps across the target, even when the target is stationary. This creates an offset in the output of the detector, similar to that in the Type 1 Class B system. The result is that the "zero Doppler" frequency at the output of the detector is the frequency offset created by the Bragg Cell. Target velocity across the interference pattern further offsets this frequency one way and motion in the other direction offsets the frequency in the other direction. Thus this system can tell the direction of motion.

The Type 2 Class C system is similar to the Type 2 Class A system. There is a delay added to one of the two arms and the laser frequency is swept up and then down. The sweeps are treated as two independent steps. Because of the delay and the frequency sweep, the frequencies out of the two arms landing on the target are different and the interference pattern on the target slides one way during one sweep and the other during the other sweep. The direction of motion can be determined using a method similar to that of the Type 1 Class C system. The problem with this system is that the sweep rate must be precisely controlled. This is very hard to do with a laser. If it is not, an error of the Doppler shift is generated.

However, the above systems have a complicated velocimeter or need components that are expensive or requiring significant power.

There is also a traditional Doppler radar system that measures the velocity of a target. This system has separate antennas for transmit and receive sections. The received signal is mixed, using quadrature mixers, with a sample of the transmit signal. The result of the mixing operation is to give a pair of signals (one called "real" the other "imaginary") that, in combination, can be used to determine both the Doppler shift (velocity) and direction. If the real and imaginary signals are plotted against one another and there is a Doppler shift, over time, they will trace out a circle. The direction traced out (clockwise vs. counter-clockwise) gives the Doppler shift (velocity) direction and the number of circles drawn per second gives the Doppler shift (velocity) magnitude. This parallels Type 1 Class E system.

There is also a type of Doppler radar system that is built very differently from the traditional system. Most laser systems and this Doppler radar system have only a single mixer, which means that the above technique used in the traditional radar system does not work.

FIG. 1 illustrates a simplified block diagram of the Doppler radar system. There is an oscillator 110, operating at, for example, 13.3 GHz, which is used to generate the transmit power and local oscillator frequency (reference frequency for a quadrature mixer 150). The oscillator 110 has a frequency control that is used to frequency-modulate the oscillator frequency between two frequencies, for example, 450 KHz apart. The goal of the frequency shifting is to put the zero Doppler frequency at the output of an image rejection mixer 140 to a nonzero value (in this case 450 KHz) so that the sign of the Doppler frequency can be easily determined. To use one antenna 160 for both transmitting and receiving, it is time shared between the two functions. The transmit and receive switches 120 and 130 are used to control which of these functions the antenna 160 is being used for. The frequency of the oscillator 110 is switched simultaneously with the transmit/receive switches 120 and 130. One is frequency for transmitting and the other for receiving. The idea is that the same oscillator 110 is used for both the transmit power and the local oscillator power, at a different frequency from transmitting, during receiving. This puts the zero Doppler frequency out of the image rejection mixer 140 at the difference between the two oscillator frequencies.

The output of the image rejection mixer 140 is amplified and bandpass filtered (not shown) and applied to the quadrature mixer 150. The output of this mixer 150 can be used as in a standard system to determine the Doppler frequency and its sign.

However, the difference between the two different frequencies generated from the oscillator 110 cannot be precisely controlled. This would mean that one would not know precisely the zero Doppler frequency at the output of the image rejection mixer 140, creating an unacceptable error. A few Hertz error would be significant. Seemingly, this system could not possibly work, but it does.

After mathematical analysis of these systems, it becomes apparent that the zero Doppler frequency is determined by the frequency that is used to control the transmit/receive and frequency control. Only frequencies that are harmonics of that switching rate can exist. The oscillator frequency shift only controls the power distribution between the harmonics of the switch rate. If the laser frequency shift drifts from the desired operating frequency shift, it does not create a measurement error, it just changes the signal power and the maximum distance the target may be from the system.

One embodiment of the invention is a velocity measurement system that can sense both the direction and magnitude of motion by combining the Doppler radar system with a laser based velocity measurement system. Specifically it relates to how to sense that direction of motion without the addition of Bragg cells or other similar devices.

One embodiment of the invention is used to measure the relative motion between the device and a target. With appropriate implementations, separation between device and target can be a fraction of a meter to 100's or 1000's of meters. Even though systems having only one beam are illustrated, most applications may have at least two and usually three or four and possibly five or six beams. It is understood that the additional beams are implemented as the first beam, probably sharing some or most of the implementation.

Figure 2:
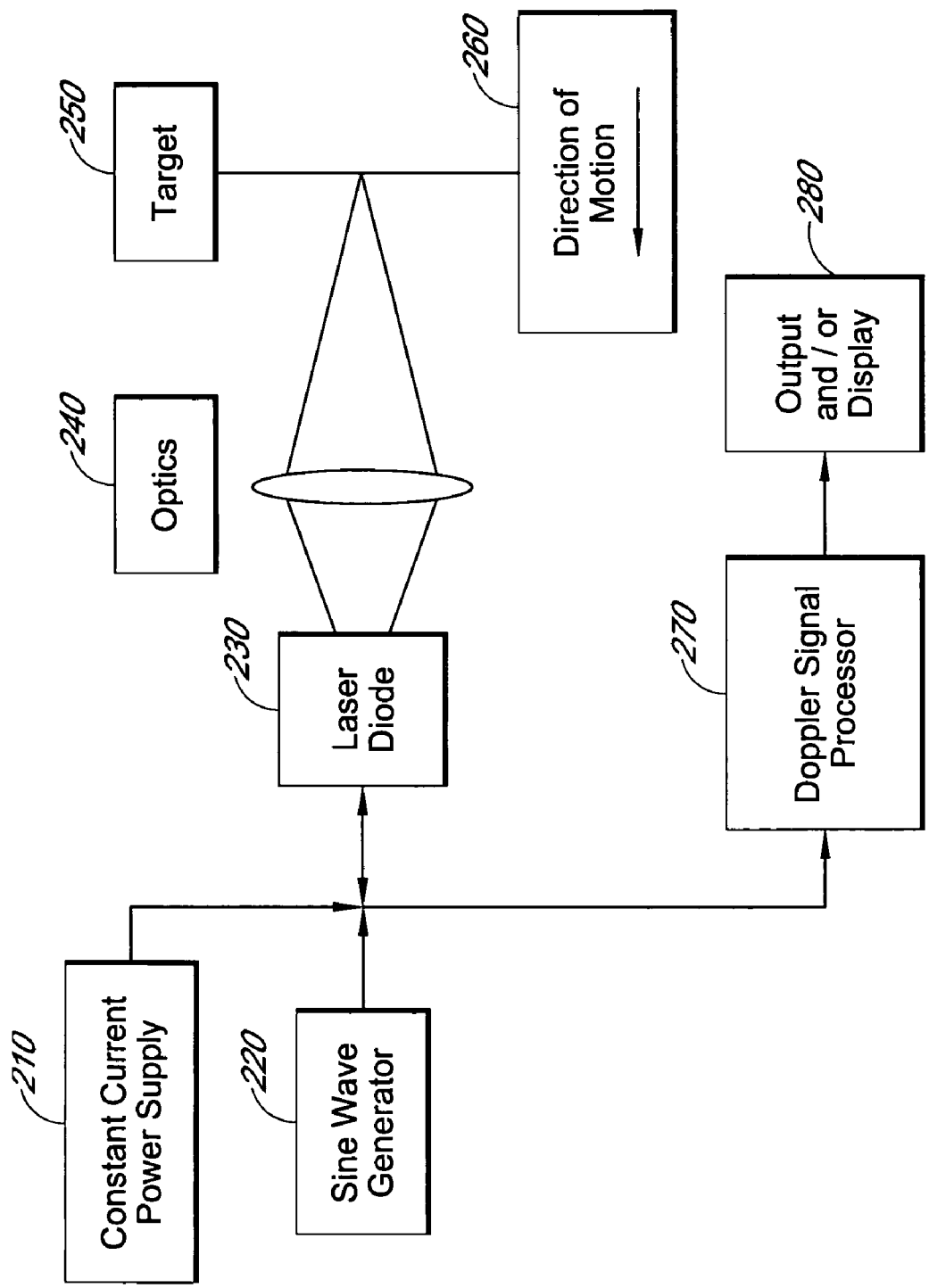
FIG. 2 illustrates a block diagram of the velocity measurement system according to one embodiment of the invention.

In one embodiment, as illustrated in FIG. 2, a laser diode 230 is used as both the source of the energy and the detector as described in "Laser Doppler Velocimeter using the self-mixing effect of semiconductor laser diode," Shinohara, et al., Applied Optics 25, May 1, 1986, 1417–1419. Many laser diode assemblies contain both a laser diode and a detector diode that is intended to monitor the output of the laser diode. That diode may also be used as a detector of laser energy of the received signal. A constant current power supply 210 provides a current to power the laser diode 230. The voltage across the diode 230 is changed by the received optical energy. Usually this is to be avoided and isolators are used to prevent this from happening by blocking the reflected energy. Here some advantages of this effect are being taken.

In one embodiment, the laser diode 230 includes a VCSEL (Vertical Cavity Surface Emitting Laser) available from Honeywell. This diode operates at 870 nm and the wavelength gives a sensitivity scale factor of 435 nanometers/second/Hertz of Doppler shift.

The laser diode 230 is powered by a DC current source provided from the constant current power supply 210. In one embodiment, the power of the laser diode 230 is approximately 1 mw (milliwatt), this power both puts it in the "eye safe" power level and limits the maximum separation between this velocimeter system and the target to several inches, possibly a foot.

The provided current is modulated by a small (parts per million of the DC current source) amplitude sine wave generated in a sine wave generator 220. This sine wave is used by the diode 230 to amplitude modulate (AM) and frequency modulate (FM) the laser light signal. The sine wave also changes the voltage at the electrical input to the diode 230. In this case, the amplitude modulation and the voltage change are nuisances and the frequency modulation is desired. However, in most other communication applications, the amplitude modulation would be desired and the modulation much greater. Thus, one embodiment of the invention ignores the amplitude modulation and the voltage change of the diode 230. Changing the current in the diode 230 changes the charge density in the diode 230, which changes the speed of light and the lasing frequency.

In other inventive embodiments, a separate frequency-modulating section may be provided and located either inside or outside of the laser diode 230.

The laser optical output is focused on a target 250 by an optics assembly 240, which reflects the light. Some of the reflected energy is collected by the optics assembly 240 and focused back on the laser diode 230. This light enters the laser diode 230 and influences its operation, which changes the voltage at the electrical input of the laser diode 230. If a monitor diode is available and used for detection, both the light from the laser diode 230 and the target 250 must land in the same spot on the detector and from the same direction. The detected "output" is then processed in a typical Doppler signal processor 270 to determine the velocity of the target 250. The processed signal is output or displayed through an output/display 280. Reference numeral 260 represents the direction of the velocity of the target 250.

For the small amount of sinusoidal current used to modulate the diode 230, it can be assumed that the voltage created by the current at the diode electrical input and the amplitude modulation are also sinusoidal. It is assumed that the frequency of the sine wave is F. Then, since modulation signal is very small, the amplitude modulation and the voltage change are also a signal with frequency F. This means that there are no harmonics thereof, 2F, 3F, 4F, etc. generated in the amplitude modulation and the voltage change. This is not true of FM, which generates many harmonics. With sinusoidal modulation the FM harmonics are determined by Bessel functions.

Mathematically the following is happening. The output of the frequency modulated laser diode 230 can be represented as. $X(t) = \text{Cos}(\omega_c t + \phi(t))$ Equation 1

The transmitted signal is delayed by $t_D$ as it travels to the target 250 and back and mixed with the (non-delayed) transmitted signal. The result is $$R(t) = X(t)X(t-t_D) = \text{Cos}(\omega_c t + \phi(t))\text{Cos}((\omega_c + \omega_D)(t-t_D) + \phi(t-t_D))$$ Equation 2 where R(t) is the result of the mixing operation, $\omega_c$ is the carrier frequency, $\omega_D$ is the Doppler shift and $\phi(t)$ is the phase modulation.

$$R(t) = \text{Cos}(\omega_D t + \phi(t-t_D) - \phi(t))$$ Equation 3 after the high frequency terms are discarded and ignoring $\omega_D t_D$, which is a random phase shift.

Assume that $\phi(t) = \beta \text{Cos}(\omega_m t)$, then $$R(t) = \text{Cos}(\omega_D t)\text{Cos}(\beta_1 \text{Sin}(\omega_m(t - t_D/2))) - \text{Sin}(\omega_D t)\text{Sin}(\beta_1 \text{Sin}(\omega_m(t - t_D/2)))$$ Equation 4 and (see any book on modulation theory or Reference Data for Radio Engineers: Radio, Electronics, Computer and Communications, Indianapolis, Ind., Howard W. Sams & Co., 1985, p. 46–39)

$$R(t) = \text{Cos}(\omega_D t)\left(J_0(\beta_1) + 2\sum_{n=1}^{\infty} J_{2n}(\beta_1)\text{Cos}(2n\omega_m(t - t_D/2))\right) - 2\text{Sin}(\omega_D t)\left(\sum_{n=1}^{\infty} J_{2n-1}(\beta_1)\text{Sin}((2n-1)\omega_m(t - t_D/2))\right)$$ Equation 5

Notice that the $\text{Cos}(\omega_D t)$ terms are associated with even order harmonics and Bessel orders and the $\text{Sin}(\omega_D t)$ terms with odd harmonics and Bessel orders. It is assumed for the convenience that the zero order (harmonic) is ignored because it can get confused with the DC bias on the diode. It is also assumed that the first order (harmonic) is ignored because it will be confused with the modulating signal.

Using the second and third orders gives:

$$R(t) = 2J_2(\beta_1)\text{Cos}(\omega_D t)\text{Cos}(2\omega_m(t-t_D/2)) - 2J_3(\beta_1)\text{Sin}(\omega_D t)\text{Sin}(3\omega_m(t-t_D/2))$$ Equation 6

Now provide two local oscillators $\text{Cos}(2\omega m(t-t_D/2))$ and $\text{Sin}(3\omega_m(t-t_D/2))$ that are separately mixed with R(t) (and the high frequency terms ignored)

$$\text{Re}(t) = \text{Cos}(2\omega_m(t-t_D))R(t) = 2J_2(\beta_1)\text{Cos}(\omega_D t)\text{Cos}(2\omega_m(t-t_D/2))^2 = J_2(\beta_1)\text{Cos}(\omega_D t)$$ Equation 7

$$\text{Im}(t) = \text{Sin}(3\omega_m(t-t_D))R(t) = 2J_3(\beta_1)\text{Sin}(\omega_D t)\text{Sin}(3\omega_m(t-t_D/2))^2 = J_3(\beta_1)\text{Sin}(\omega_D t)$$ Equation 8

Equations 7 and 8, respectively, represent a complex pair needed to do the Doppler processing. The Doppler processing may be done any number of ways from here. Usually Re(t) and Im(t) are combined into a complex channel $\text{Re}(t) + j\text{Im}(t)$ ($j = \sqrt{-1}$) and processed.

One embodiment of the invention calculates the complex autocorrelation, $\Re(\tau_L)$, function at some convenient lag, $\tau_L$, and calculates the Doppler frequency from $f_D = \tan^{-1}(\text{Im}(\Re(\tau_L))/\text{Re}(\Re(\tau_L)))/2\pi\tau_L$. See Miller, et al., "A Covariance Approach to Spectral Moment Estimation", IEEE Transactions on Information Theory, September 1972, pp. 588–596.

In one embodiment, the Doppler signal processor 270 comprises a conventional Doppler signal processor. In this embodiment, the system comprises a quadrature mixer (as shown in FIG. 1) between the laser diode 230 and the Doppler signal processor 270. The quadrature mixer processes an emitted (frequency-modulated) signal and a reflected (detected) signal received from the laser diode 230, and provides a signal being suitable for use in the conventional Doppler signal processor as discussed below.

If the frequency modulating sine wave is $\cos(\omega_m t)$ then, to obtain the real part, the quadrature mixer multiplies the detected signal by $\cos[2\omega_m (t-t_d)]$ (see Equation 7) and to obtain the imaginary part it multiplies the detected signal by $\sin[3\omega_m (t-t_d)]$ (see Equation 8). $t_d$ is the round trip delay time between the frequency-modulating section of the laser diode 230 and the target 250. In one embodiment, the time td is small enough and can be ignored.

In one embodiment, td could be used to determine the distance toward the target 250. By adjusting td of $\sin[2\omega_m (t-t_d)]$ and $\cos[3\omega_m (t-t_d)]$ (note that the sine and cosine have been interchanged) until the resulting signals are nulled, an estimate of the range can be obtained. In one example, the range is $t_d \times c/2$ where c is the speed of light.

Alternatively, as shown in FIG. 2, the Doppler signal processor 270 may not need a quadrature mixer and may directly obtain velocity information from an emitted (frequency-modulated) signal and a detected signal received from the laser diode 230.

The invention may be embodied to various systems, discussed above, which measure the magnitude and direction of velocity as follows.

Example 1 represents velocity interpretation using the Type 1 system in a very short range. In Example 1, it is supposed that a laser with a wavelength of 635 nm is used so that it can easily be seen if the beam is on the target.

In Example 1, since the maximum velocity is 50 m/s, the maximum Doppler frequency is 3.15 MHz/(m/s)×50(m/s) =157 MHz. In order to avoid the confusion of one of the FM harmonics with the Doppler, the minimum modulating frequency, F in above, is defined twice that, 315 MHz. Beta is the ratio of the frequency deviation of the FM to the modulating frequency. The second and third harmonics of a sinusoidal FM process are equal at Beta of approximately 3.77 (Beta1). There is a relation between Beta and Beta1, $\beta_1 = 2\beta \sin(\omega_m t_D/2) = 2\beta \sin(\omega_m d_D/c)$, where $d_D$ is the target distance. Knowing that Beta1 is 3.77 and the other factors in the equation, Beta=3.07. Thus if the minimum modulating frequency is 315 MHz, then the deviation must be 3.07×315 MHz=968.5 MHz. This corresponds to 2 ppm (parts per million) of the laser's frequency.

EXAMPLE 1

| Doppler Data For 635 nm Laser | |
|---|---|
| Laser-Target Range, m | 0.1 |
| Wavelength, nm = | 635 |
| Maximum Velocity, m/s | 50 |
| Result | |
| Doppler Scale factor, MHz/m/s | 3.15 |
| Minimum Modulating Frequency, MHz | 315.0 |
| Beta | 3.07 |
| Deviation, MHz | 968.5 |
| Deviation, ppm | 2.0 |
| Beta1 | 3.77 |

The Doppler scale factor (SF) is determined from the laser wavelength, $SF=2/\lambda$. Assuming the velocity measurement range is twice the maximum velocity, the ranges of Doppler frequency range are $2(SF)V_{max}=4V_{max}/\lambda$. The modulation frequency, $F_m$, $\omega_m=2\pi F_m$, is at least this amount.

Example 1 provides an opportunity to point out that a "tunable" laser is not required. The word tunable means that a laser frequency may be tuned over a significant frequency (wavelength) range. Only two parts in a million is required here. This is easily accomplished by small modulation of the operating current of a laser diode or the current driving other lasers that are powered by current flow, such as Helium Neon. For instance, Honeywell characterizes its VCSEL laser as having a wavelength tuning sensitivity of $d\lambda/dI \sim 0.09$ nm/mA, which is equivalent to 100 ppm/mA, even though Honeywell would not call their product "tunable". The laser frequency changed by changing the drive current is typically a problem in communication systems, because as the drive is changed to turn the laser on an off, the frequency is also swept creating a "chirp" effect.

Example 2 represents velocity interpretation using the Type 1 system in a long range. In Example 2, a $CO_2$ laser is used.

EXAMPLE 2

| Doppler Data For 10600 nm ($CO_2$) Laser | |
|---|---|
| Laser-Target Range, m | 1000 |
| wavelength, nm = | 10600 |
| Maximum Velocity, m/s | 50 |
| Result | |
| Doppler Scale factor, MHz/m/s | 0.19 |
| Minimum Modulating Frequency, MHz | 18.9 |
| Beta | 3.03 |
| Deviation, MHz | 57.1 |
| Deviation, ppm | 2.0 |
| Beta1 | 3.77 |

The $CO_2$ laser can be made with very high power and, since it has a longer wavelength, a lower scale factor, which may be convenient, because it permits lower modulating frequency for a given maximum velocity.

In one embodiment of the invention, the laser light is not visible to the naked eye, but is readily so to a CCD or CMOS video camera, including camcorders. Thus it is possible to verify that the actual target is the intended target, unlike radar based systems.

One embodiment of the invention is also used in the Type 2 system. The Type 2 system requires the laser output to be split into two beams that are recombined on the target and a detector be used to monitor the reflection from the target. They can be built using these principles by putting unequal delays in the two arms. A way of doing this is to launch the laser output into an optical fiber. The power can be split into two paths using a power splitter. The two paths then have different lengths and illuminate the target. The differential path length is $t_D$ in the above equations.

Figure 3:
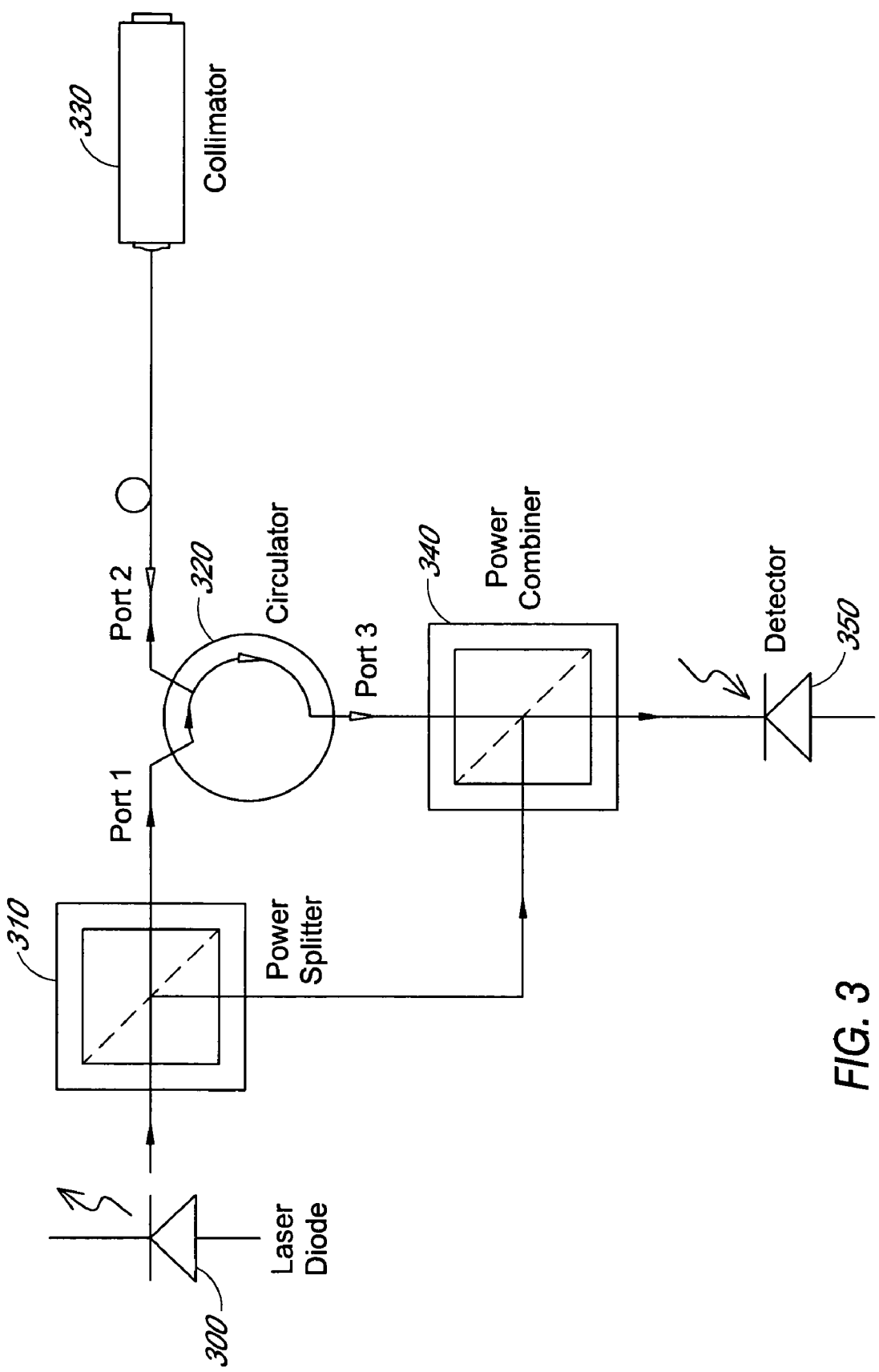
FIG. 3 illustrates a block diagram of the velocity measurement system according to another embodiment of the invention.

Another embodiment of the invention uses a separate detector 350, as shown in FIG. 3, instead of using the laser as both the source and detector. The power supply, modulator and Doppler signal processor are not shown in FIG. 3. The laser output from the laser diode 300 is split into two paths by a power splitter 310: one going via a circulator 320 and a collimator 330, reflected by the target (not shown), back through the collimator 330 and circulator 320 to the power combiner 340 to the detector 350. The other path leaves the power splitter 310 and is combined with the first path at the power combiner 340 and, along with the first path to the detector 350. The circulator 320 is used to route the reflection from the target away from the laser diode 300 and toward the detector 350. This implementation lends itself to the use of fiber optic components. The same signal processing scheme as described above could be used to extract the Doppler velocity information. One embodiment of the invention may insert an isolator between the laser diode 300 and the power splitter 310 to prevent energy from being reflected back into the laser diode 300.

In one embodiment, a separate frequency-modulating section may be located inside or outside of the laser diode 300. In one embodiment, one of the two (frequency-modulated) laser signals and one reflected signal from the target 250, which have different signal path from each other, can be sampled and provided to the detector 350. In another embodiment, the detector 350 can receive and combine one of the emitted laser signals and one reflected signal. In another embodiment, a separate combining section, which may be located internal or external to the detector 350 can perform a combining function such as the multiplying of the sampled signals.

Figure 4:
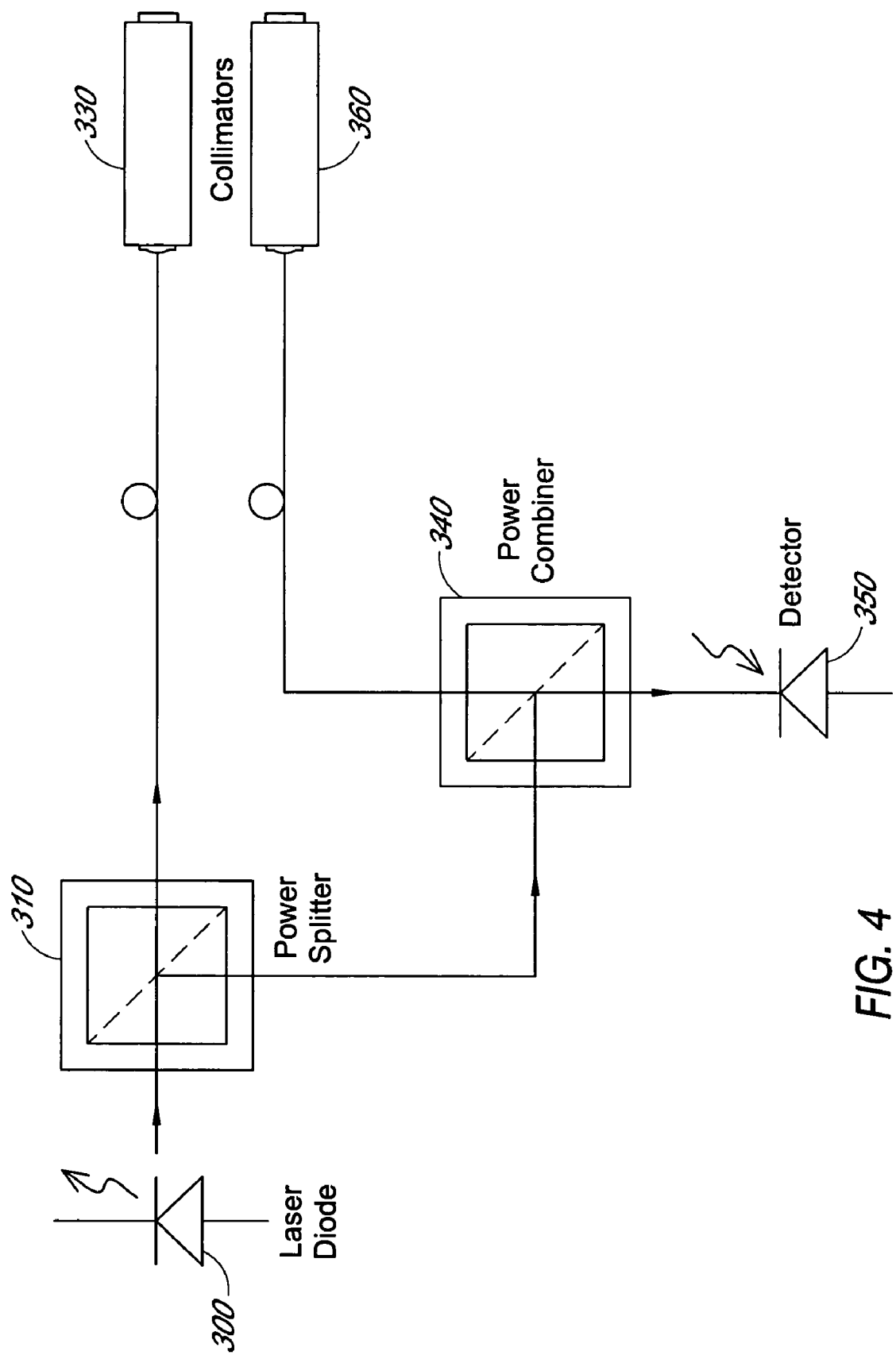
FIG. 4 illustrates a block diagram of the velocity measurement system according to still another embodiment of the invention.

Another embodiment of the invention uses separate transmit and receive collimators 330 and 360, as shown in FIG. 4. This implementation uses completely independent paths for transmit and receive with only local oscillator power flow connecting the two. Again, the power supply, modulator and Doppler signal processor are not shown in FIG. 4. The laser output from the laser diode 300 is split into two paths by the power splitter 310. This time, the first path of the laser output is fed to the transmit collimator 330, reflected by the target (not shown), back through the receive collimator 360 and the power combiner 340 to the detector 350. The other path leaves the power splitter 310 and is combined with the first path at the power combiner 340 and, along with the first path to the detector 350. The same signal processing scheme as described above could be used to extract the Doppler velocity information.

Figure 5:
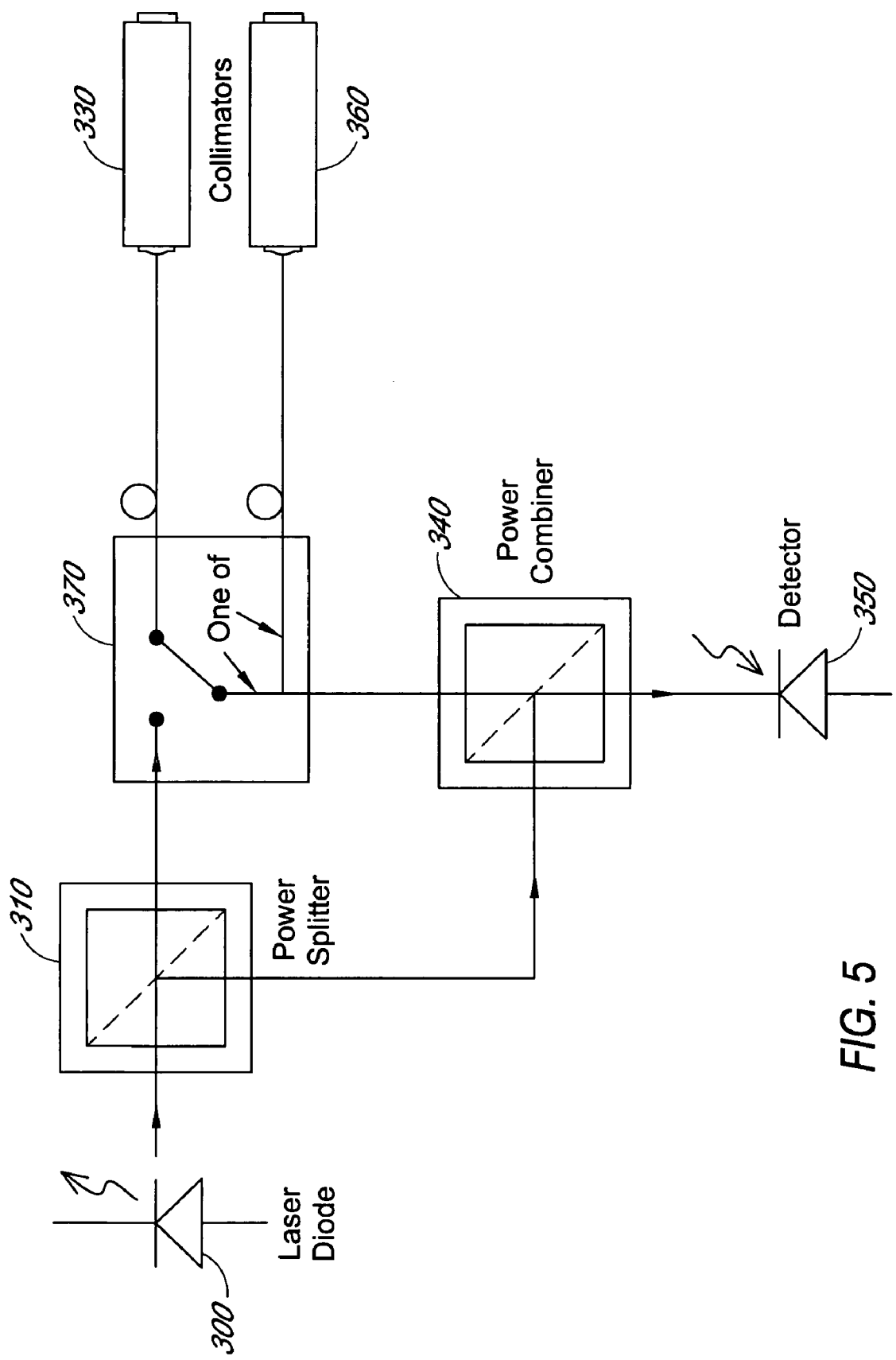
FIG. 5 illustrates a block diagram of the velocity measurement system according to yet another embodiment of the invention.

Another embodiment of the invention uses a transmit/receive switch 370, as shown in FIG. 5. There may be times when it is desirable to turn the transmitter on and off. One situation when this may be desirable is in a fog or rain. If transmission is continuous, the reflection from the fog or rain near the system may overwhelm the receiver, preventing the system from responding to more distance targets. With this version, square wave modulation is desirable instead of sine wave. In this embodiment, the switching and modulation may be done together so the laser frequency is one value during receiving and another during transmitting. It is noted that the laser diode 300 may not be tuned off as it will lose its coherence.

The above systems may use one or two collimators as desired, depending upon the option chosen in various situations.

If the delay of the echo is one half the transmit-receive cycle time, there will be no received echo. The echo returns during the transmit time. This is called a range hole. The range holes may be reduced in significance by using a pseudorandom sequence to determine the transmit receive state.

If its delay is small compared to the transmit-receive time; the received signal to the signal processor is nearly independent of range. This is because the instantaneous receive signal voltage, during the short time it is present, is inversely proportional to range. But the width of the pulse is proportional to range. Combining these gives $\sin(x)/x$, where $x = T_r \pi/T$, $T_r$ is the receive duration and is proportional to the target range, and T is the transmit-receive cycle time. This holds until $T_r = T/2$, when some of the received echo starts to fall into the next range hole.

The invention can be applied to the sensing of the speed or amount of material extruded through a die, sheet metal through a roller, cable on (or off) a spool, speed of a car, train or ball, speed of the surface of a liquid such as water, or molten metals, including aluminum. That is, many applications of velocity measurement systems actually measure length, by integration of the velocity measurement. For example, the laser Doppler velocimeter system is used to measure the speed of a cable (or fabric or lumber or rope) that is moving under it. By integration of the velocity measurement, the length of the cable (or fabric or lumber, rope) may be determined. The length may be the primary interest of the user, not the primary measurement, velocity. If the laser Doppler velocimeter is attached to a trailer (rail car, tractor), it can measure the speed of the trailer. By integration, the distance of the path traveled may be determined. If the heading and original position is added, the present position may be determined. This is known as dead reckoning.

It is also noted that speed or velocity may be integrated to become distance, so that even though the primary measurement is velocity or speed, distance or amount follows right behind. Plural applications are described below in more detail.

Configuration of Laser Beams for Different Applications

Like all Doppler based systems, to measure three components (u, v, w) of velocity requires at least three beams pointing in different directions. The velocity components u, v and w are in the direction of x, y and z respectively. To simplify things, V, X and F are used to represent vectors containing estimates of the components of velocity, position or location change and Doppler frequency, and $V_i$, $X_i$ and $F_i$ are used to represent the ith component of velocity, position location change, and Doppler frequency.

The Doppler frequency is calculated from the velocity as $F(t)=2\lambda AV(t)$, where A is an N×M matrix made of the direction cosines of the Doppler beam directions and N is the number of beams and M is the number of components of velocity and is 1, 2 or 3. To get from the measured frequency to velocity the following formula is applied $V(t)=A^{-1}F(t)/2\lambda$, assuming that N=M where $A^{-1}$ is the inverse of A.

In the special case of a single beam with only one component of velocity, the velocity can be calculated from $V(t)=F(t)\lambda/2\cos(\theta)$, where $\theta$ is the angle between the beam direction and the direction of motion.

If the velocity is known, position or location change can be calculated by integrating velocity. The classic example is dead reckoning. Dead reckoning is how airplane pilots navigated before the advent of modern navigation aids. The idea is that if the pilot knows where she was at the start of the flight and her speed and direction since then, she knows where she is now. Mathematically, in order to get the distance, including the direction from the velocity component, the calculation that is required is integration.

The velocity components once measured can be integrated to obtain the distance moved since velocity times time equals distance. Thus, if the beam's target or the Doppler system (or its mount) is moved, the distance which is moved can be obtained by integrating the measured velocity with respect to time.

To show more clearly the integration the equations are:

$$X(t) = \int_0^t V(t)\,dt + X_{initial},$$

where $X_{initial}$ is the initial location or amount, usually zero.

Figure 6:
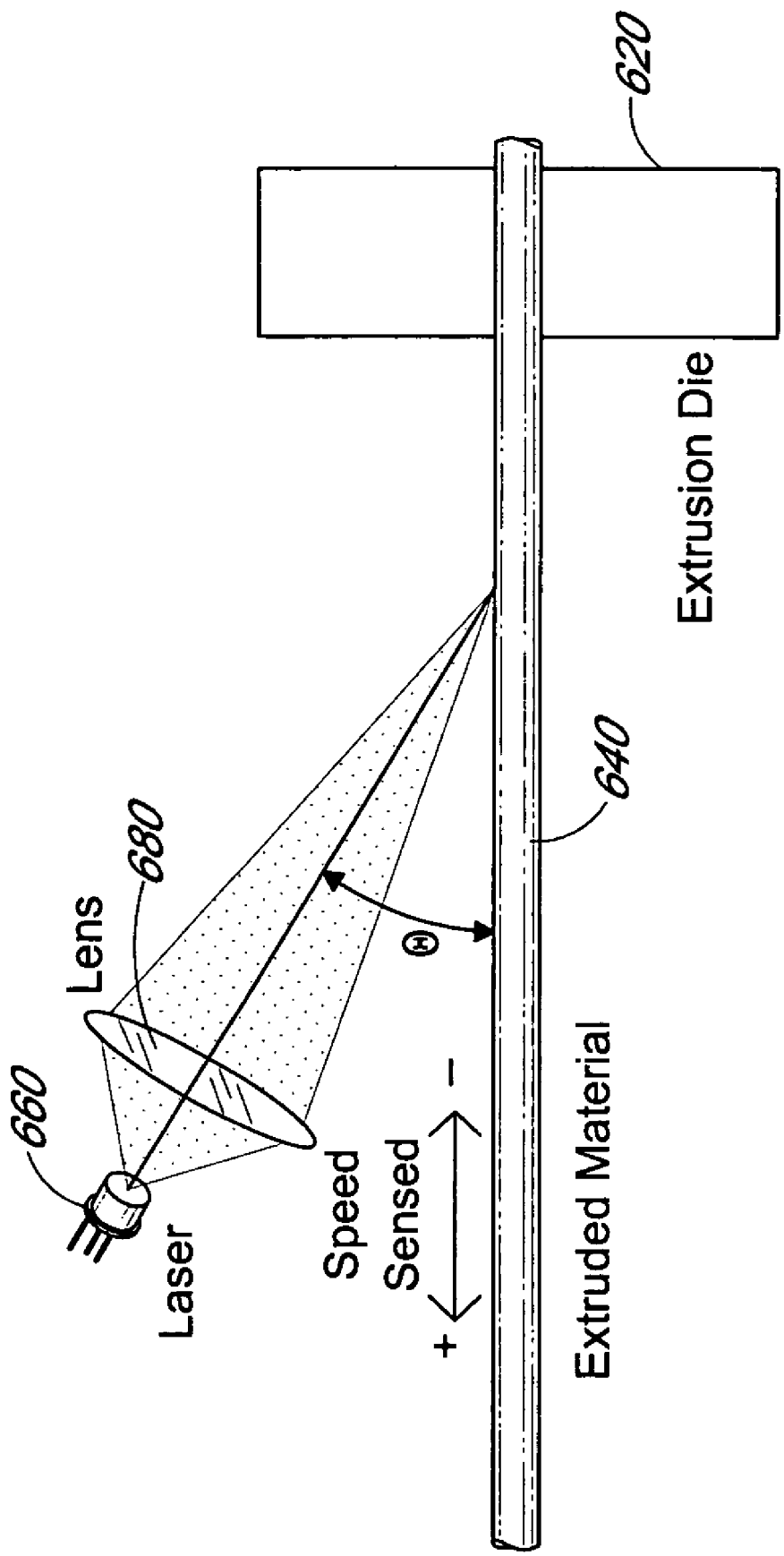
FIG. 6 illustrates a configuration for measuring the rate at which a cable is extruded through a die in one application of the invention.

There are a number of applications for single beam systems. These can be used to measure the amount or rate something is produced, for instance. FIG. 6 shows a configuration for measuring the rate at which a cable 640 is extruded through a die 620. A common method of doing this is to have the cable go over a pulley and count pulley revolutions. This works very well if precision is not required. As the cable goes over a pulley it invariably slips by an unknown amount, creating an underestimate of the amount of cable that went over the pulley. Also the cable jacket must have cooled enough that the jacket is hard enough not to be damaged as it comes in contact with the pulley.

It is assumed that, other than the angle θ, the beam emitted from a laser 660 is pointed in the direction of motion through a lens 680. The velocity is calculated from $V(t)=F(t)\lambda/2\cos(\theta)$. If this assumption is incorrect, the error can be corrected by further dividing by $\cos(\phi)$, where $\phi$ is the amount of the beam which is misaligned with the cable motion The velocity measured is positive for a closing velocity, in this case as the material 640 is extruded. This equation and correction for misalignment are used for all the other single beam examples given here. In the unlikely event that the cable 640 moves back into the die 620, a negative velocity will be measured, indicating that the cable 640 did move backward. When the velocity is integrated, the amount of the cable 640 extruded will be obtained. Notice that it is desirable to place the sensor in a section of the cable 640 where the cable 640 is straight. If the cable 640 is bent, for instance when it goes over a pulley (another pulley error), the cable 640 on the outside of the bend will get a little longer and the length over measured and the cable 640 on the inside of the bend will be under measured.

Figure 7:
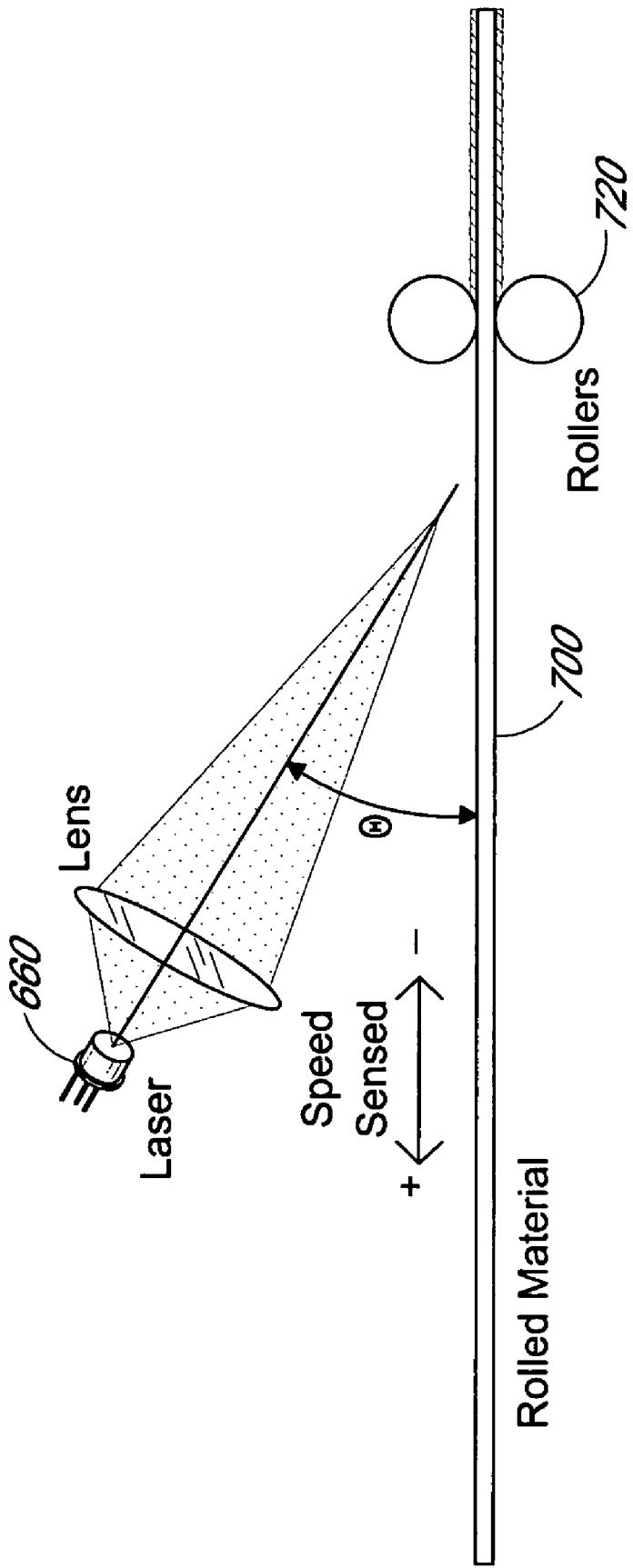
FIG. 7 illustrates the use of a single beam to measure the amount or rate of material being such as metal using rollers in another application of the invention.

FIG. 7 shows the use of a single beam to measure the amount or rate of material (sheet metal, for instance) as it leaves rollers 720 in a roller mill. FIG. 7 is a similar application involving measuring the rate and/or amount of material leaving rollers. Again the velocity is calculated from $V(t)=F(t)\lambda/2\cos(\theta)$. Notice that the laser 660 does not touch the material. It is noted that only the laser energy is in contact with the item that is being measured. This is desirable if the material 700 is soft enough to be damaged if contacted by a roller or is hot enough to damage a sensor that is in contact with the material 700. In rolling applications it is possible to roll different amounts of material at opposite ends of the roller 720. The laser Doppler method permits multiple sensors to be installed along the roller 720 to ensure that the same amounts of material are made along the entire length of the roller 720.

Figure 8:
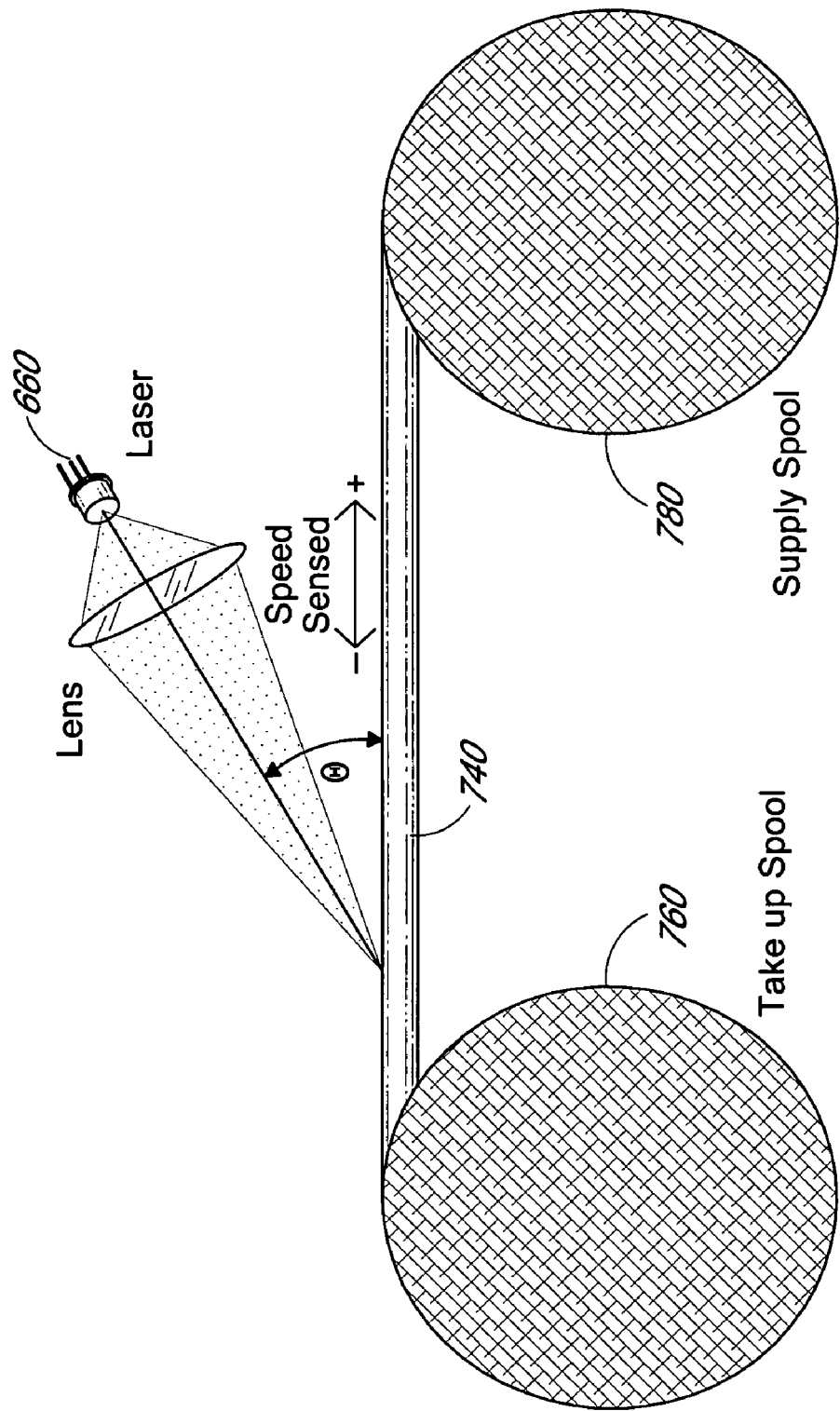
FIG. 8 illustrates the use of a beam to measure the speed and/or amount of a cable being transferred between two spools in another application of the invention.

FIG. 8 shows the use of a beam to measure the speed and/or amount of cable being transferred between two spools 760, 780. This is shown here just to point out the option exists and the consequence that the sign will be negative for normal operation, because the cable 740 moves in the opposite direction relative to the beam of the previous examples. Of course the system could be designed to permit the sign to be reversed during setup. Also the cable 740 should be straight at the measuring point to avoid errors.

In FIG. 8, the measurement is usually done by having the cable 740 roll over a pulley and counting pulley rotations and is subject to slipping errors. This example shows the beam pointing in the opposite direction compared to the cable motion as it flows from the supply spool 780 to the take up spool 760. This is done for variety and to make the point that the sign of the motion and distance (length) will be opposite to that of the other examples shown in FIGS. 6 and 7. It is possible during installation to set the direction of positive motion.

Figure 9:
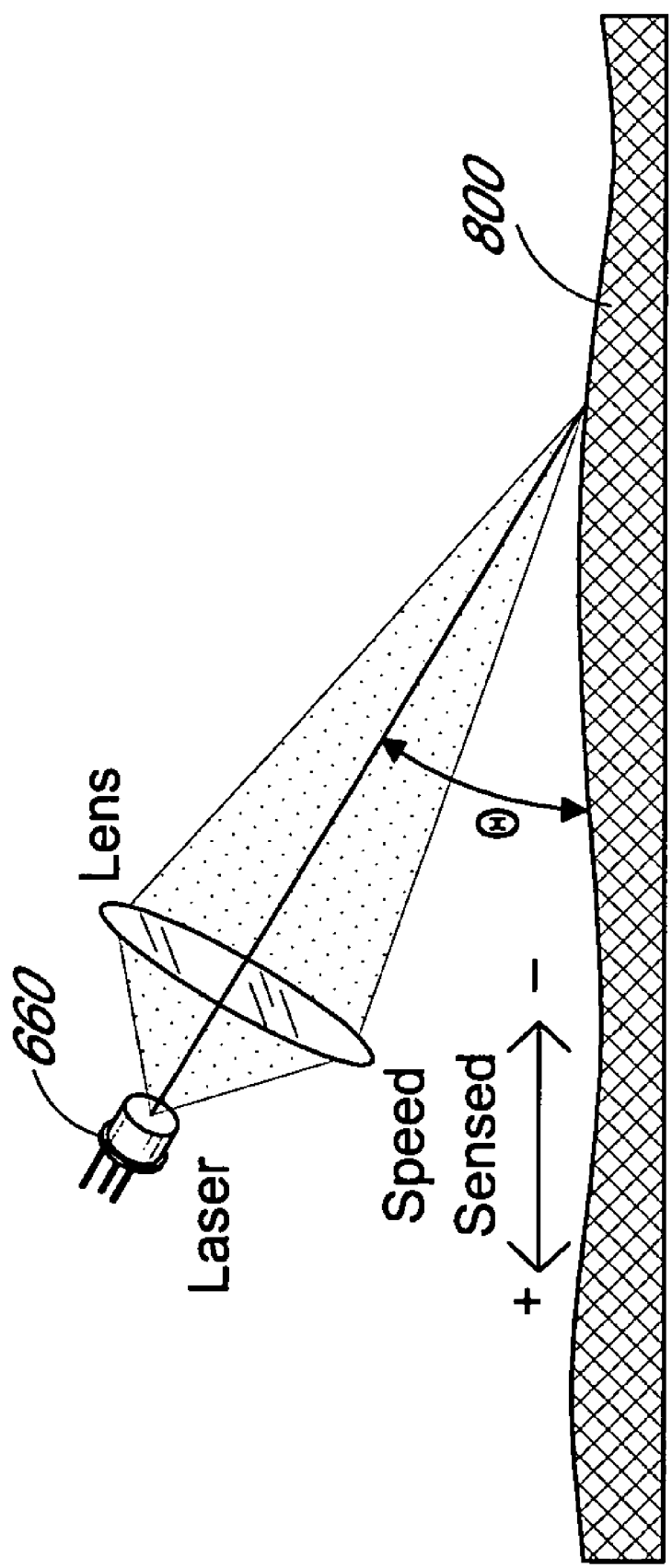
FIG. 9 illustrates a beam used to measure the flow of a liquid in a channel in another application of the invention.

FIG. 9 shows a beam used to measure the flow of a liquid 800 in a channel. The liquid 800 could be a molten metal, water or any other liquid. It is assumed that the laser Doppler system is aligned to the channel and that the channel is straight. Using a laser Doppler system has an advantage in this case of not requiring the sensor to contact the fluid 800. The fluid 800 may be too hot or corrosive to allow a contact sensor to survive or function.

Figure 10:
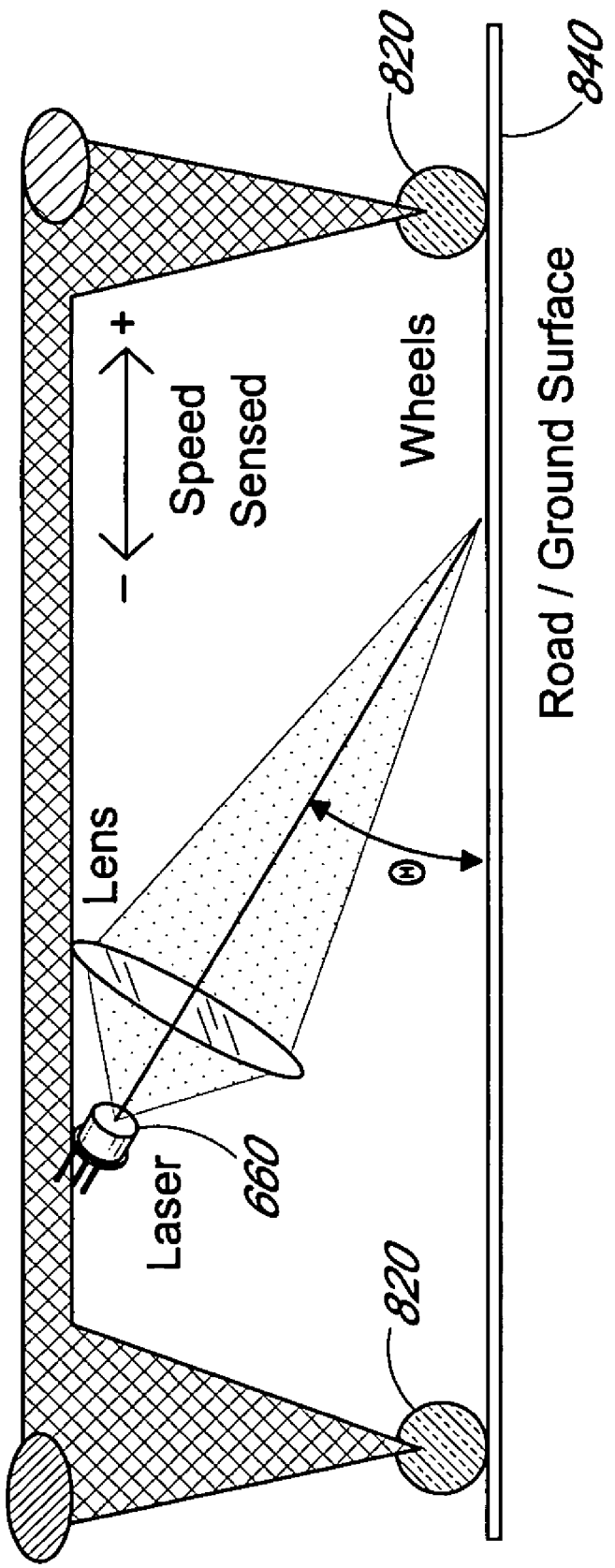
FIG. 10 illustrates a laser Doppler system mounted to a vehicle in another application of the invention.

FIG. 10 shows a laser Doppler system mounted to a car (railroad, motor vehicle, military tank, etc.). In this case, the laser Doppler system is mounted to the vehicle. The usual way to build a speedometer or odometer is to estimate wheel rotation speed or to count wheel revolutions. This solution has an added error factor because the vehicle's wheels 820 slip on the ground, road bed or rail 840.

It is noted that the sign of the measurement was flipped. Positive velocity is the distance between the Doppler System and its target getting smaller (closing velocity). In the other cases, the Doppler system was stationary and the target moving; in this case, it is the other way, thus the sign changes.

Figure 11:
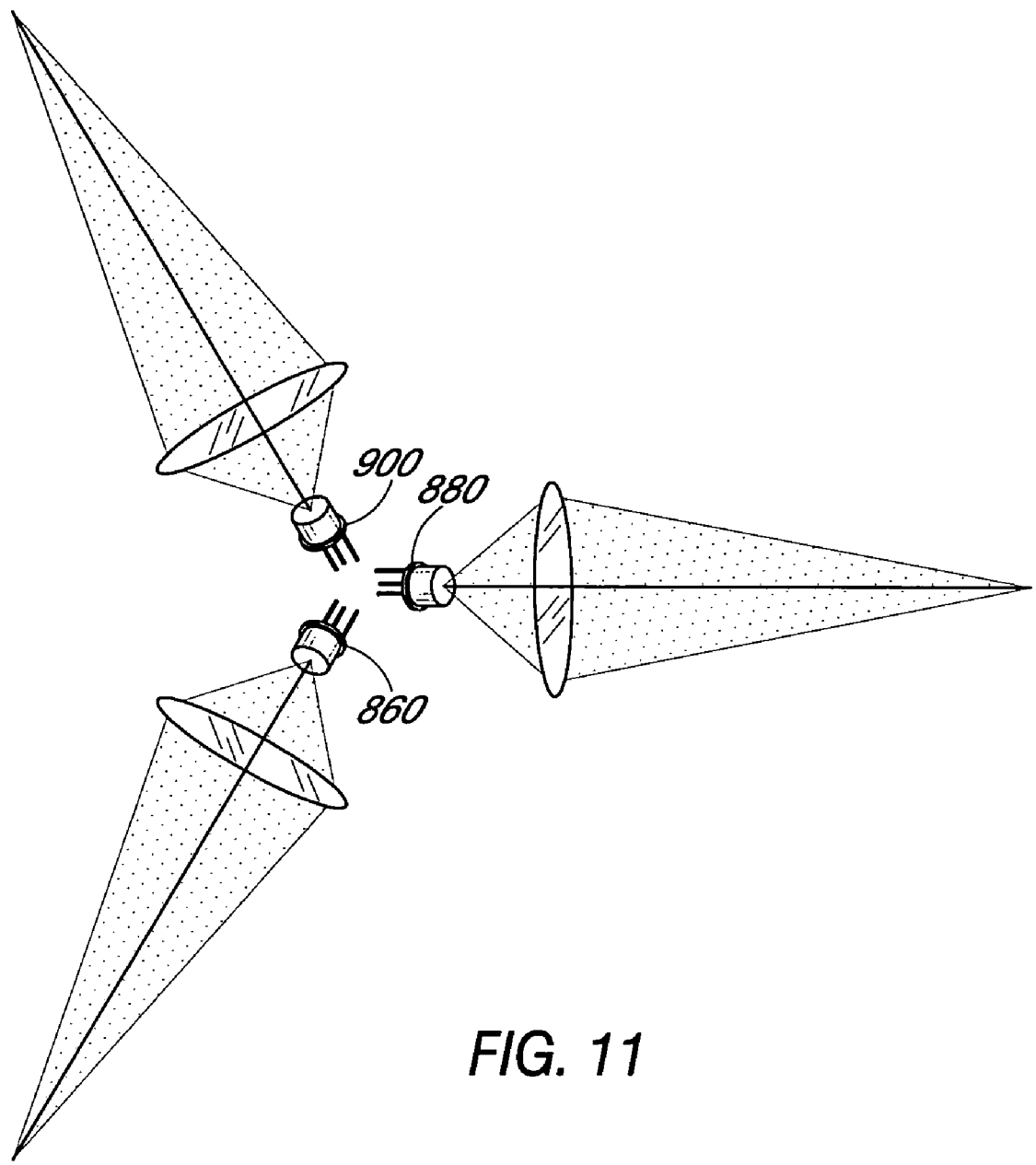
FIG. 11 illustrates an arrangement of three lasers and their optics pointing in three different directions to get the three components of velocity in another application of the invention.
Figure 13:
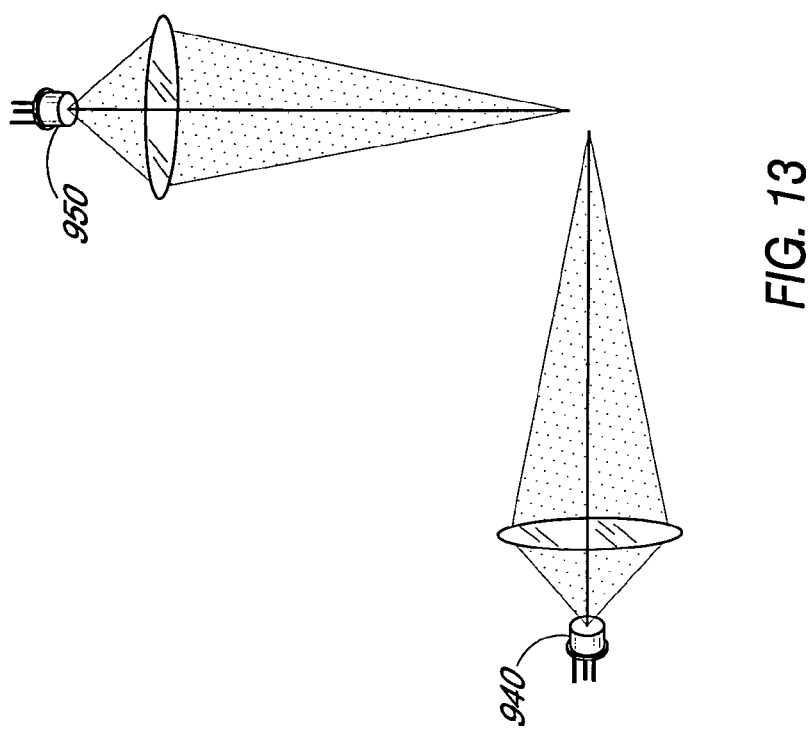
FIG. 13 illustrates an arrangement of two lasers and their optics pointing in two different directions to get two components of velocity in another application of the invention.

To measure all three components of velocity requires three laser beams. Two of an infinite number of possible configurations of laser Doppler beams for measuring these 3 components are shown in FIGS. 11 and 13. It is not clear in the figures, but the beams are slanted downward (as θ in FIGS. 6 to 10) toward and focused on a surface or sheet whose velocity is to be estimated. Alternately the surface could be stationary and it is the velocity of the Doppler system or what it is mounted on that is desired.

FIG. 11 shows an arrangement of three lasers 860–900 and their optics pointing in three different directions to get the three components of velocity. This is a view from above. The beams are slanted down toward the surface whose velocity is being measured. This configuration is handy if it is desirable to have the lasers and their optics near one another. It may be possible to share the same lens with this configuration. This configuration requires that the target have the same velocity at all three target locations, as is usually the case.

Figure 12:
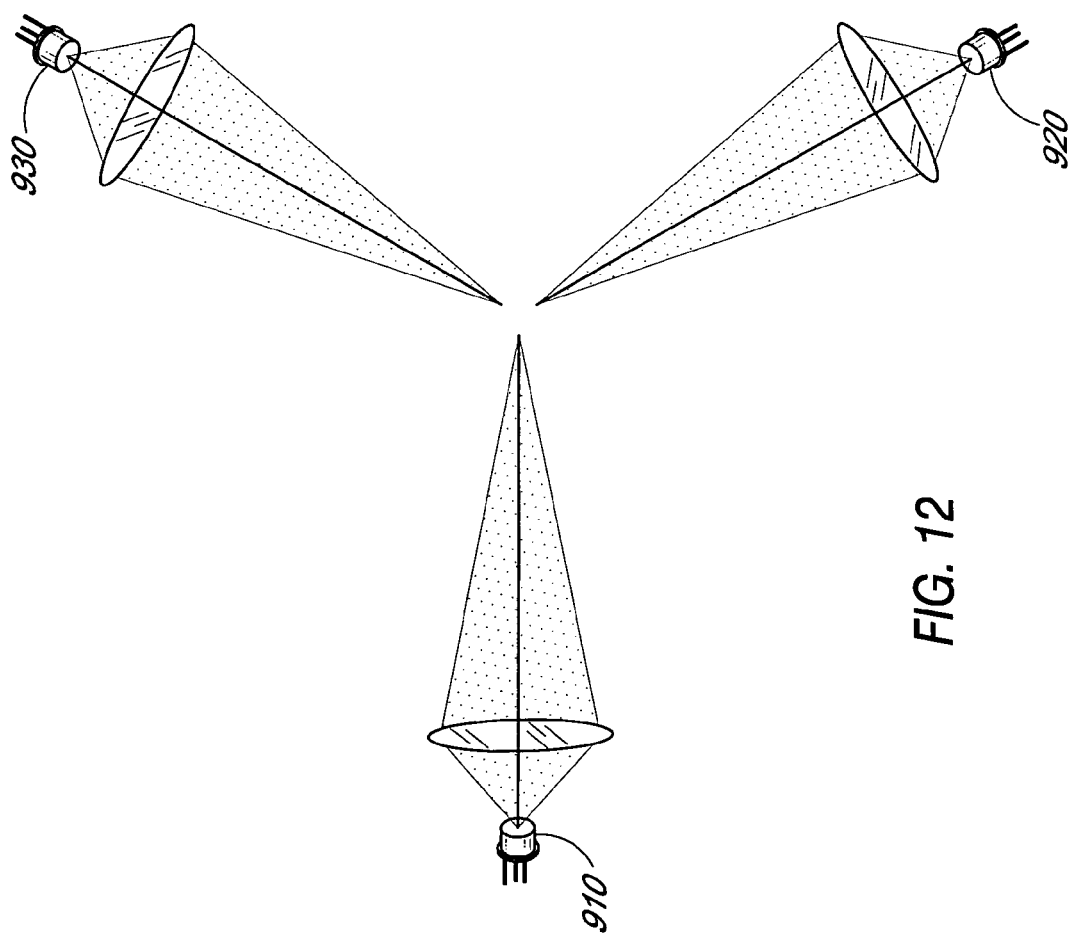
FIG. 12 illustrates an alternate arrangement of three lasers and their optics pointing in three different directions to get three components of velocity in another application of the invention.

FIG. 12 shows an alternate arrangement of three lasers 910–930 and their optics pointing in three different directions to get three components of velocity. This is a view from above. The beams are slanted down toward the surface whose velocity is being measured. This configuration is desirable if the target is small or if the surface velocity is different at different locations, as usually is the case if the target is a fluid, because all the beams are focused at near the same point.

FIG. 13 shows an arrangement of two lasers 940, 950 and their optics pointing in two different directions to get two components of velocity. The assumption is that the third component is known, usually zero. This is a view from above. The beams are slanted down toward the surface whose velocity is being measured.

Figure 14:
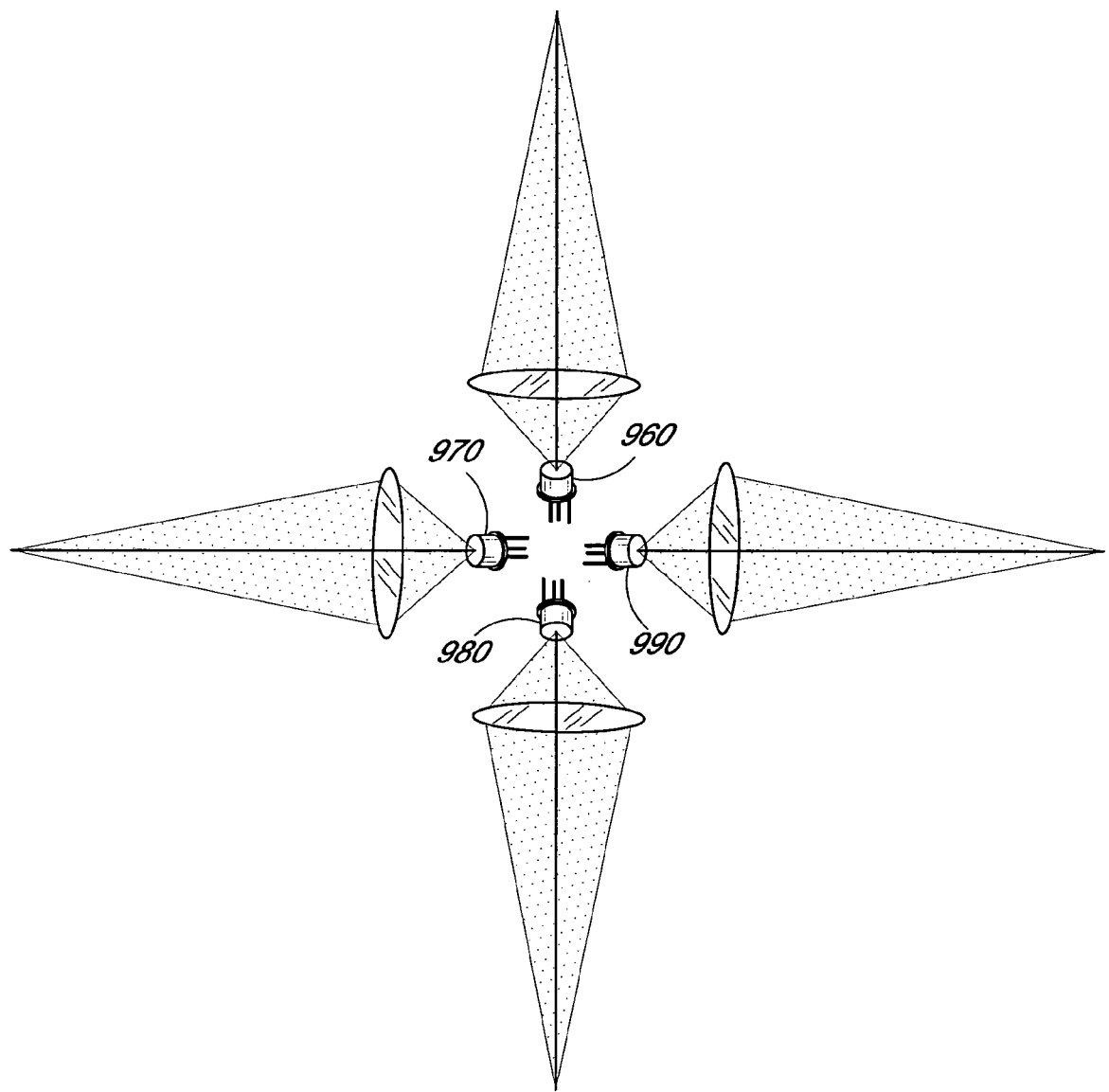
FIG. 14 illustrates a four beam system which is over determined and permits an error velocity to be estimated in another application of the invention.

FIG. 14 shows four beams 960–990. This four (or more) beam system is over determined and permits an error velocity to be estimated. The four beam system is known as the Janus configuration.

Systems using four or more beams allow an error velocity to be estimated because they are over determined. "Over determined" means that there are more beams than there are velocity components to measure. Using three beams to estimate two components is another example of the "over determined." This permits the calculation of non-existent (in the real world) velocity components that should be zero and, to the extent they are not, indicate measurement error and can be used to judge the overall velocity estimate.

In summary, reasonable applications of the invention include, but are not limited to, the following:
- Measurement of the speed and direction of motion (two axis, using 3 beams) of ground vehicles (tanks), which aid fire control or navigation systems or permit dead reckoning,
- Measurement of a closing velocity of two aircrafts or measuring a ground velocity of an aircraft or a missile,
- Speed gun,
- Speed of rotating machinery,
- channel liquid flow,
- Non-contact vibration measurement from DC to many MHz, and
- Integrating the LDV's output gives distance measurements. This could be used to, measure the length of targets (cables, fabric, rope,) that move at the focal point.

One embodiment of the invention can sense ground velocities on the order of micrometers per second (with small displacements, typically a few nanometers) at acoustic frequencies from about 50 Hz to about 1 kHz.

Another embodiment of the invention can use interferometric (or heterodyne) sensing of the reflected light for directing and manipulating the laser beams internal to the sensor head.

Another application for the laser Doppler velocimeter is as a laser Doppler vibrometer. By directing the laser Doppler velocimeter at a vibrating target, the velocimeter can be used as a vibrometer. When the velocimeter is pointed at the vibrating target, the measured velocity is the velocity of the vibrations of the target. If the measurements of the velocity (sampling rate of the velocity) are significantly greater then twice the highest vibration frequency, a time series of the vibration velocity of the target is obtained.

Usually, the desired vibration information produced by a vibrometer is the displacement of the vibration, not the velocity of the vibration. The displacement can be obtained by integrating the velocity time series with respect to time. If a frequency spectrum of the vibration is desired, as is commonly the case, the Fourier transform of the velocity time series can be calculated. If the Fourier transform of the displacement is required, it can be obtained by dividing each value of the velocity frequency spectrum by its frequency value.

This could be useful if a non-contact vibrometer is desired. This could be also useful if non-contact is important; e.g., the target is too soft, too hot, a liquid, or uneven to make contact with. Another type of application is that since it does not contact the target, it may be used to scan or sweep across the surface target in search of something.

Another application for the laser Doppler velocimeter is as a microphone. By using the velocimeter as a vibrometer and pointing it at a membrane that is designed to be vibrated by sound waves, the output of the laser Doppler velocimeter is a time series of the sound pressure hitting the membrane, which is what a microphone does. If the walls of a room or chamber are being vibrated by the sound waves on the other side of the wall, this could be used to listen to the sound on the other side of the wall.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A system for measuring velocity of a target, comprising:
   a laser device configured to produce a frequency-modulated laser beam, wherein the frequency-modulated beam is split into at least two laser beams, wherein a reflected beam comprising one split beam is directed to the target and reflected from the target;
   a detector configured to detect a combination of the reflected beam and a reference beam comprising another split beam, wherein the reflected beam and the reference beam have unequal delays; and
   a signal processor configured to obtain velocity information from the combined beam by use of Doppler-shifted harmonics of the modulation frequency.

2. The system of claim 1, wherein the detector and the laser device are configured together inside an assembly.

3. The system of claim 1, wherein the target velocity relative to the system can be positive, negative or zero.

4. The system of claim 1, wherein the obtained velocity information comprises the magnitude and the sign of the velocity.

5. The system of claim 1, wherein the harmonic signals comprise one odd harmonic and one even harmonic.

6. The system of claim 5, wherein the odd harmonic comprises a third harmonic and the even harmonic comprises a second harmonic.

7. The system of claim 1, further comprising:
   a plurality of oscillators, each oscillator providing a signal corresponding in frequency to one of the harmonic signals; and
   a plurality of mixers, each mixer configured to separately mix each of the oscillator signals with the combined signal so as to produce a mixed signal, wherein the signal processor is configured to obtain velocity information by Doppler processing the mixed signals.

8. The system of claim 7, wherein the two mixed signals are a quadrature pair suitable for processing with a quadrature mixer.

9. The system of claim 1, wherein the signal processor is further configured to obtain distance information toward the target from a comparison of different harmonics.

10. The system of claim 1, wherein the reflected beam and the reference beam are combined inside the laser device.

11. The system of claim 10, wherein the laser device comprises the detector.

12. The system of claim 10, wherein the reference beam is the frequency-modulated laser beam.

13. The system of claim 1, further comprising a separate frequency-modulation section configured to perform the frequency modulation.

14. The system of claim 1, further comprising an optics assembly configured to split the beams, direct one beam to the target and to merge the reflected beam with the reference beam.

15. The system of claim 1, wherein a reference beam is also directed to the target and combined on the target with the reflected beam.

16. The system of claim 1, further comprising an external combiner configured to combine the reflected beam and the reference beam.

17. The system of claim 1, further comprising a switch configured to enable the system to focus the velocity measurement on a specific target distance range.

18. The system of claim 1, comprising more than one laser device, each pointing in a different direction, to get more than one component of velocity.

19. The system of claim 1, wherein the obtained velocity information is used to find the position change.

20. The system of claim 1, wherein the obtained velocity information comprises the velocity of the vibrations of the target.

21. A system for measuring velocity of a target, comprising:
  a laser device configured to produce a frequency-modulated laser beam, which is directed to the target and reflected from the target, wherein the laser device comprises a detector configured to detect a combination of the beam reflected from the target and the frequency modulated laser beam, wherein the reflected beam and the frequency modulated laser beam have unequal delays; and
  a signal processor configured to obtain both sign and magnitude of the velocity from the combined beam by use of Doppler-shifted harmonics of the modulation frequency, wherein the harmonic frequencies are centered around one odd and one even harmonic of the modulation frequency.

22. The system of claim 21, wherein the signal processor is further configured to obtain distance information toward the target from a comparison of odd and even harmonic signals.

23. The system of claim 21, wherein signals derived from the second and third harmonic frequencies are used to form a quadrature mixer.

24. The system of claim 21, comprising more than one laser device, each pointing in a different direction, to get more than one component of velocity.

25. The system of claim 21, wherein the obtained velocity information is used to find the position change.

26. The system of claim 21, wherein the obtained velocity information comprises the velocity of the vibrations of the target.

27. A system for measuring velocity of a target, comprising:
  means for generating a frequency-modulated laser signal, wherein the frequency modulated signal is split into at least two split laser beams, wherein a reflected beam comprising one split laser beam is directed to the target and reflected from the target;
  means for receiving the reflected beam and a reference beam comprising another split laser beam, wherein the reflected beam and reference beam have unequal delays; and
  means for obtaining velocity information from a combination of the reflected beam and the split laser beam by use of Doppler-shifted harmonics of the modulation frequency.

28. The system of claim 27, wherein the velocity information comprises the magnitude and sign of the velocity.

29. The system of claim 28, wherein the harmonic signals comprise one odd harmonic and one even harmonic.

30. The system of claim 29, wherein the even harmonic is the second harmonic and the odd harmonic is the third harmonic.

31. The system of claim 27, further comprising means for obtaining distance information toward the target from a comparison of different harmonics.

32. The system of claim 27 wherein the generation means and the obtaining means occupy the same space.

33. The system of claim 27 wherein the generation means and the obtaining means occupy a different space.

34. The system of claim 27, further comprising means for obtaining position change from the velocity.

35. The method of claim 27, wherein the velocity information comprises the velocity of vibrations of the target.

36. A method of measuring velocity of a target, comprising:
  generating a frequency-modulated laser signal, which is directed to and reflected from the target;
  combining the reflected signal with a reference signal comprising the frequency-modulated laser signal transmitted via another signal path, wherein the reflected signal and reference signal have unequal delays; and
  obtaining velocity information from the combined signal by use of Doppler-shifted harmonics of the modulation frequency.

37. The method of claim 36, wherein the velocity information comprises the magnitude and sign of the velocity.

38. The method of claim 36, wherein the harmonic signals comprise one odd harmonic and one even harmonic.

39. The method of claim 38, wherein the even harmonic is the second harmonic and the odd harmonic is the third harmonic.

40. The method of claim 36, further obtaining distance information toward the target from a comparison of different harmonics.

41. The method of claim 36 wherein the generation and combination functions are performed in the same space.

42. The method of claim 36 wherein the generation and combination functions are performed separately.

43. The method of claim 36, wherein the obtained velocity is used to obtain the position change.

44. The method of claim 36, wherein the velocity information comprises the velocity of vibrations of the target.

* * * * *

UNITED STATES PATENT AND TRADEMARK OFFICE
CERTIFICATE OF CORRECTION

| | | |
|---|---|---|
| PATENT NO. | : 7,202,942 B2 | Page 1 of 2 |
| APPLICATION NO. | : 11/227383 | |
| DATED | : April 10, 2007 | |
| INVENTOR(S) | : Kent L. Deines | |

It is certified that error appears in the above-identified patent and that said Letters Patent is hereby corrected as shown below:

| Column | Line | Description of Error |
|---|---|---|
| Page 2 Col. 2 (Other Publications) | 12 | Delete "It-18," and insert -- IT-18, --, therefor. |
| Page 2 Col. 2 (Other Publications) | 14 | Delete "Measuravle" and insert -- Measurable --, therefor. |
| Sheet 10 of 13 (FIG. 10) | 2 | Delete "Vechicle" and Insert -- Vehicle --, therefor. |
| 1 | 60 | Delete "frequency modulated" and insert -- frequency-modulated --, therefor. |
| 2 | 16 | After "frequency" insert -- . --. |
| 8 | 33 (Approx.) | Delete "(2ωm" and insert -- (2$\omega_m$ --, therefor. |
| 9 | 10 | Delete "td" and insert -- $t_d$ --, therefor. |
| 9 | 11 | Delete "td" and insert -- $t_d$ --, therefor. |
| 9 | 12 | Delete "td" and insert -- $t_d$ --, therefor. |
| 9 | 60 (Approx.) | Delete "BetaI" and insert -- Beta1 --, therefor. |
| 10 | 34 (Approx.) | Delete "BetaI" and insert -- Beta1 --, therefor. |
| 13 | 27 (Appros.) | After "motion" insert -- . --. |

UNITED STATES PATENT AND TRADEMARK OFFICE
CERTIFICATE OF CORRECTION

PATENT NO. : 7,202,942 B2
APPLICATION NO. : 11/227383
DATED : April 10, 2007
INVENTOR(S) : Kent L. Deines It is certified that error appears in the above-identified patent and that said Letters Patent is hereby corrected as shown below:

| Column | Line | Description of Error |
|--------|------|----------------------|
| 15 | 24 | Before "channel" insert -- Open --. |

Signed and Sealed this

Seventh Day of August, 2007

JON W. DUDAS
*Director of the United States Patent and Trademark Office*